(12) United States Patent
Nito

(10) Patent No.: US 10,230,856 B2
(45) Date of Patent: Mar. 12, 2019

(54) SHEET CONVEYANCE APPARATUS AND IMAGE FORMING APPARATUS

(71) Applicant: CANON KABUSHIKI KAISHA, Tokyo (JP)

(72) Inventor: Yuta Nito, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/873,674

(22) Filed: Jan. 17, 2018

(65) Prior Publication Data

US 2018/0227448 A1 Aug. 9, 2018

(30) Foreign Application Priority Data

Feb. 9, 2017 (JP) .................. 2017-022465

(51) Int. Cl.
| | |
|---|---|
| H04N 1/00 | (2006.01) |
| G03G 15/00 | (2006.01) |
| H02P 21/24 | (2016.01) |
| H02P 21/34 | (2016.01) |
| H02P 27/12 | (2006.01) |
| H02P 27/08 | (2006.01) |
| H02P 8/12 | (2006.01) |

(52) U.S. Cl.
CPC ..... *H04N 1/00602* (2013.01); *G03G 15/6573* (2013.01); *H02P 8/12* (2013.01); *H02P 21/24* (2016.02); *H02P 21/34* (2016.02); *H02P 27/085* (2013.01); *H02P 27/12* (2013.01); *H04N 2201/0094* (2013.01)

(58) Field of Classification Search
CPC .......... H02P 21/06; H02P 21/22; H02P 21/24; H02P 21/34; G03G 15/6573; H04N 1/00602
See application file for complete search history.

(56) References Cited

U.S. PATENT DOCUMENTS

| | | | | |
|---|---|---|---|---|
| 5,334,923 A | * | 8/1994 | Lorenz ................ | H02P 6/187 318/805 |
| 6,014,006 A | * | 1/2000 | Stuntz ................ | H02P 21/13 318/799 |
| 9,952,545 B2 | * | 4/2018 | Nito ................ | G03G 15/6529 |

(Continued)

FOREIGN PATENT DOCUMENTS

JP 2007153273 A 6/2007

*Primary Examiner* — Bentsu Ro
*Assistant Examiner* — Thai Dinh
(74) *Attorney, Agent, or Firm* — Canon U.S.A., Inc. IP Division

(57) ABSTRACT

A sheet conveyance apparatus includes a connection member to connect or separate a motor to drive a conveyance roller, where a motor rotor has a rotation phase and a motor winding includes a driving current controlled by a controller. Per control by the controller, a value of a torque current component of a detected driving current becomes a target value of the torque current component and a value of an exciting current component of the detected driving current becomes a target value of the exciting current component. The controller can cause a deviation between a rotor target phase and a determined rotation phase to decrease, cause magnetic flux passing through the winding to be weaker than a magnetic flux of the rotor, and cause the magnetic flux to be stronger than that passing through the winding in a first period.

20 Claims, 10 Drawing Sheets

(56) References Cited

U.S. PATENT DOCUMENTS

2003/0006723 A1* 1/2003 Sul .................. H02P 21/24
318/127
2016/0145062 A1* 5/2016 Kamatani ................ H02P 6/16
271/275

* cited by examiner

SHEET CONVEYANCE APPARATUS AND IMAGE FORMING APPARATUS

BACKGROUND OF THE INVENTION

Field of the Invention

The present disclosure relates to controlling a motor in a sheet conveyance apparatus and an image forming apparatus.

Description of the Related Art

A control method called vector control has heretofore been known as a method for controlling a motor. Vector control controls a motor by controlling a current value in a rotating coordinate system based on a rotation phase of a rotor of the motor. Specifically, there has been known a method for controlling a motor by phase feedback control in which a current value is controlled in the rotating coordinate system in such a manner that a deviation between a command phase and the actual rotation phase of the rotor decreases. There has also been known a method for controlling a motor by speed feedback control in which a current value is controlled in the rotating coordinate system in such a manner that a deviation between a command speed and the actual rotation speed of the rotor decreases.

In vector control, a driving current supplied to a winding of the motor is expressed by a current component (torque current component) that generates torque for rotating the rotor and a current component (exciting current component) that affects an intensity of a magnetic flux passing through the winding. Torque needed for rotation is efficiently generated by controlling the value of the torque current component according to a change in load torque acting on the rotor. This suppresses an increase in motor noise and an increase in power consumption due to surplus torque. This also prevents the rotor from going out of synchronization with an input signal and the motor from entering an incontrollable state (step-out state) because the load torque acting on the rotor exceeds output torque corresponding to the driving current supplied to the winding of the motor. During vector control, the value of the exciting current component is usually controlled so as to become zero. As a result, an increase in power consumption is suppressed.

Rotation of the rotor generates an induced voltage in the winding of each phase of the motor. If an induce voltage occurs in the windings of the motor, the voltage applicable to the windings of the motor decreases. Specifically, suppose, for example, that a power supply for applying a voltage to the windings of the motor has a voltage of 24 V. In such a case, a voltage obtained by subtracting the induced voltage occurring in the windings from the power supply voltage (24 V) can be applied to the windings. The occurrence of the induced voltage in the windings thus makes the voltage applicable to the windings lower than 24 V. The magnitude of the induced voltage increases when the rotation speed of the rotor increases. The higher the rotation speed of the rotor, the lower the voltage applicable to the windings of the motor. As the voltage applicable to the windings of the motor decreases, torque that can be given to the rotor (hereinafter, referred to as torque T) also decreases.

Japanese Patent Application Laid-Open No. 2007-153273 discusses a configuration for weakening an intensity of a magnetic field passing through the windings of the motor (field weakening) by controlling the value of the exciting current component to a negative value corresponding to the rotation speed of the rotor if the rotation speed is a speed threshold or more. There is a one-to-one correspondence between the rotation speed and the value of the excitation current component. Specifically, a predetermined value of the exciting current component is set with respect to a predetermined rotation speed. Field weakening reduces the magnitude of the induced voltage occurring in the windings. This can suppress a decrease in the voltage applicable to the windings and can prevent the torque T from decreasing. The greater the absolute value of the negative value of the exciting current component, the more the torque T can be prevented from decreasing.

A sheet conveyance apparatus for conveying a sheet, such as a recording medium or a document, includes a plurality of loads like rollers for conveying the sheet. A plurality of loads is sometimes driven by one motor. In such a case, for example, the loads are driven by connecting and separating the motor and the loads by a clutch.

FIG. 1 is a block diagram illustrating a configuration of a motor and conveyance rollers serving as loads. As illustrated in FIG. 1, a conveyance roller 701 is driven by a motor 509. The motor 509 and a conveyance roller 702 are connected and separated by a clutch 700.

The clutch 700 connects and separates the motor 509 and the conveyance roller 702 in a state in which the rotor of the motor 509 is rotating at a predetermined speed (constant speed). In other words, a period in which the rotor of the motor 509 rotates at the predetermined speed includes a period during which the motor 509 and the conveyance roller 702 are not connected and a period during which the motor 509 and the conveyance roller 702 are connected. If the motor 509 is driving the conveyance roller 701 in such a manner that the motor 509 and the conveyance roller 702 are separated, load torque corresponding to the conveyance roller 701 acts on the rotor of the motor 509. If the motor 509 and the conveyance roller 702 are connected while the motor 509 is driving the conveyance roller 701, not only the load torque corresponding to the conveyance roller 701 but also load torque corresponding to the conveyance roller 702 acts on the rotor of the motor 509. The load torque acting on the rotor thus increases when the motor 509 and the conveyance roller 702 are connected by the clutch 700. As the loads connected to the motor 509 increase, the load torque acting on the rotor of the motor 509 in rotating the rotor at a predetermined speed increases. In the period in which the rotor rotates at a predetermined speed, the torque T therefore decreases due to the induced voltage occurring in the windings. In the period in which the rotor rotates at a predetermined speed, the load torque acting on the rotor can thus exceed the torque T due to the connection of the loads to the motor 509. If the load torque exceeds the torque T, the rotor becomes unable to rotate.

In the configuration discussed in Japanese Patent Application Laid-Open No. 2007-153273, the rotation speed and the value of the exciting current component have a one-to-one correspondence. In the period in which the rotor rotates at a predetermined speed, the exciting current component is therefore set to a predetermined value corresponding to the predetermined speed.

As described above, in the period in which the rotor rotates at a predetermined speed, the load torque during the period in which the motor and a load are connected is higher than that during the period in which the motor and the load are not connected. In other words, if the configuration discussed in Japanese Patent Application Laid-Open No. 2007-153273 is applied to the control of the motor that is connected to and separated from a load by the clutch, the value of the exciting current component needs to be set in consideration of the load torque during the period in which the motor and the load are connected, in such a manner that the load torque will not exceed the torque T.

The larger the value of the exciting current component in absolute value, the greater the current supplied to the windings of the motor. If the value of the exciting current component is set in consideration of the load torque during the period in which the motor and the load are connected, an unneeded current can be supplied to the windings during the period in which the motor and the load are not connected. As a result, the power consumption increases.

SUMMARY OF THE INVENTION

The present disclosure is directed to efficiently performing motor control.

According to an aspect of the present invention, a sheet conveyance apparatus for conveying a sheet includes a conveyance roller configured to convey the sheet, a motor configured to drive the conveyance roller, a connection member configured to connect or separate the conveyance roller and the motor, a phase determiner configured to determine a rotation phase of a rotor of the motor, a detector configured to detect a driving current flowing through a winding of the motor, and a controller configured to control the driving current in such a way that a value of a torque current component of the driving current detected by the detector becomes a target value of the torque current component, and control the driving current in such a way that a value of an exciting current component of the driving current detected by the detector becomes a target value of the exciting current component, wherein the torque current component is a current component that generates torque on the rotor and is expressed in a rotating coordinate system based on the rotation phase determined by the phase determiner, wherein the exciting current component is a current component that affects an intensity of a magnetic flux passing through the winding and is expressed in the rotating coordinate system, wherein the controller is configured to set the target value of the torque current component such that a deviation between a command phase indicating a target phase of the rotor and the rotation phase determined by the phase determiner decreases and, in a first period after first timing in a period in which the rotor rotates at a predetermined speed, set the target value of the exciting current component such that the magnetic flux passing through the winding becomes weaker than a magnetic flux of the rotor and, in a second period before the first timing, set the target value of the exciting current component such that the magnetic flux passing through the winding becomes stronger than that passing through the winding in the first period, wherein the first timing is a predetermined time before the conveyance roller and the motor are connected by the connection member.

Further features of the present invention will become apparent from the following description of embodiments with reference to the attached drawings.

DESCRIPTION OF THE EMBODIMENTS

An embodiment will be described below with reference to the drawings. Shapes and a relative arrangement of components described in the embodiment are subject to appropriate changes according to a configuration and various conditions of an apparatus to which the embodiment is applied. The scope is not to be limited to the following embodiment. In the following description, a motor control device is described to be provided in an image forming apparatus. However, the provision of the motor control device is not limited to an image forming apparatus. For example, the motor control device may be used in a sheet conveyance apparatus for conveying a sheet such as a recording medium or a document.

[Image Forming Apparatus]

Figure 1:
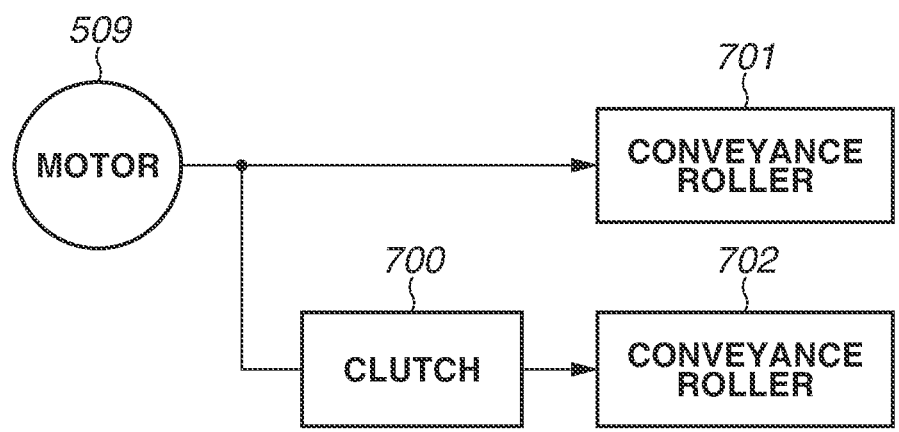
FIG. 1 is a block diagram illustrating a configuration of a motor and loads.
Figure 2:
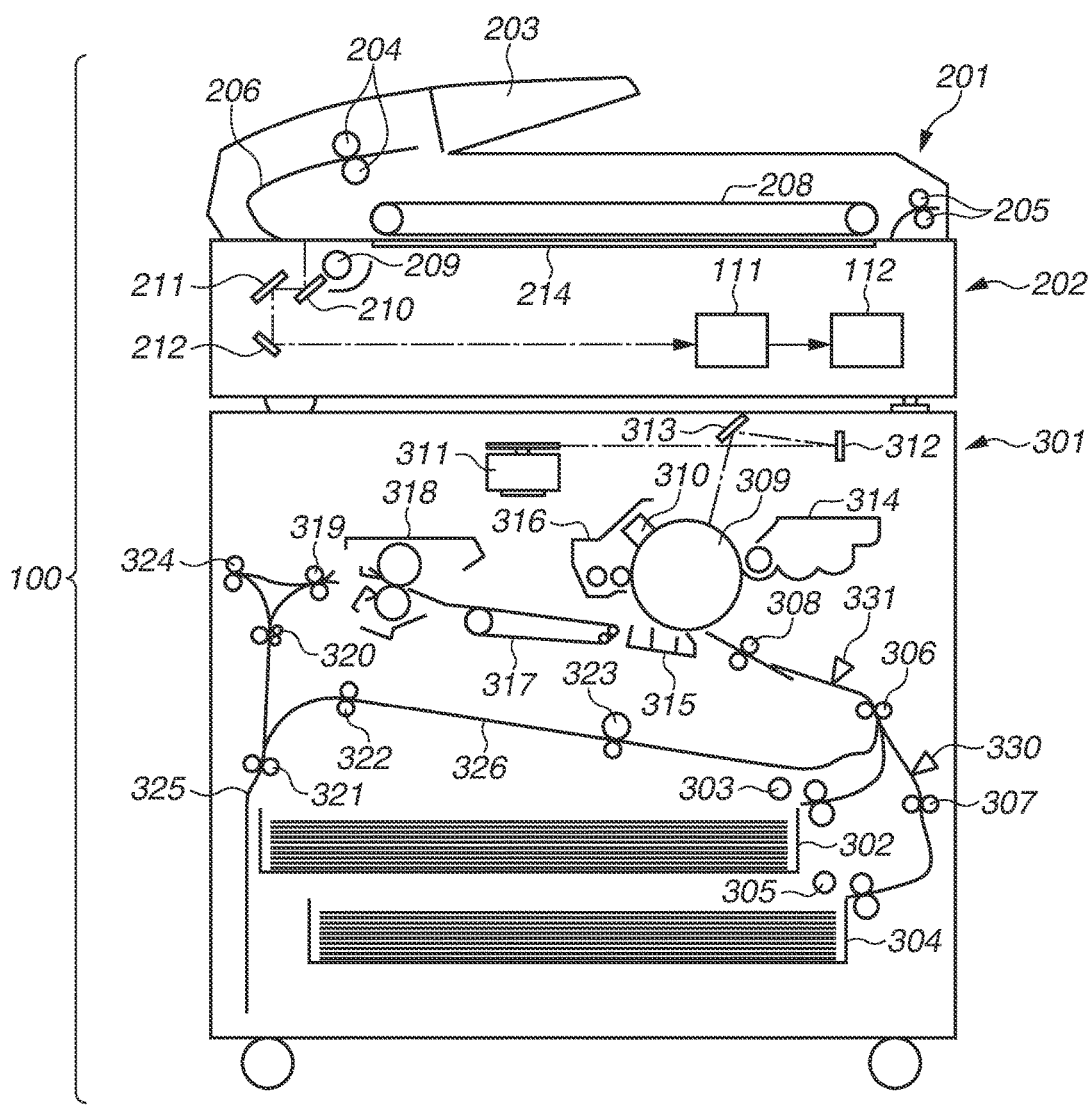
FIG. 2 is a sectional view for describing an image forming apparatus according to a first embodiment.

FIG. 2 is a sectional view illustrating a configuration of a monochrome electrophotographic copying machine (hereinafter, referred to as an image forming apparatus) 100 which includes a sheet conveyance apparatus used in a first embodiment. The image forming apparatus is not limited to a copying machine. For example, the image forming apparatus may be a facsimile apparatus, a printing machine, or a printer. The recording method is not limited to an electrophotographic method. For example, the recording method may be an inkjet method. The image forming apparatus may be of either a monochrome or color model.

The configuration and functions of the image forming apparatus 100 will be described below with reference to FIG. 2. The image forming apparatus 100 includes a document feeding apparatus 201, a reading apparatus 202, and an image printing apparatus 301.

Documents stacked on a document stacking unit 203 of the document feeding apparatus 201 are fed by feed rollers 204 one by one, and conveyed along a conveyance guide 206 onto a document glass plate 214 of the reading apparatus 202. The document is further conveyed by a conveyance belt 208 at a constant speed, and discharged to a discharge tray (not illustrated) by discharge rollers 205. Reflected light from a document image irradiated by an illumination system 209 at a reading position of the reading apparatus 202 is guided to an image reading unit 111 by an optical system including reflection mirrors 210, 211, and 212, and converted into an image signal by the image reading unit 111. The image reading unit 111 includes a lens, a charge-coupled device (CCD) which is a photoelectric conversion element, and a driving circuit of the CCD. An image processing unit 112 including a hardware device such as an application specific integrated circuit (ASIC) performs various types of correction on the image signal output from the image reading unit 111. The resulting image signal is output to the image printing apparatus 301. In such a manner, the document is read. That is, the document feeding apparatus 201 and the reading apparatus 202 function as a document reading apparatus.

Reading modes of a document include a first reading mode and a second reading mode. In the first reading mode, an image of a document conveyed at a constant speed is read by the illumination system 209 and the optical system that are fixed in a predetermined position. In the second reading mode, an image of a document placed on the document glass plate 214 of the reading apparatus 202 is read by the illumination system 209 and the optical system that move at a constant speed. An image of a sheet-like document is usually read in the first reading mode. An image of a bound document, such as a book and a booklet, is read in the second reading mode.

The image printing apparatus 301 includes sheet storage trays 302 and 304 inside. The sheet storage trays 302 and 304 can store respective different types of recording media. For example, A4-size plain paper is stored in the sheet storage tray 302. A4-size thick paper is stored in the sheet storage tray 304. Recording media refer to ones on which the image forming apparatus 100 forms an image. Examples of the recording media include a sheet of paper, a resin sheet, cloth, an overhead projector (OHP) sheet, and a label.

The recording media stored in the sheet storage tray 302 is fed by a feed roller 303 and delivered to a registration roller 308 by a conveyance roller 306. The recording media stored in the sheet storage tray 304 are fed by a feed roller 305 and delivered to the registration roller 308 by a conveyance roller 307 and the conveyance roller 306. As illustrated in FIG. 2, sheet sensors 330 and 331 for detecting the presence or absence of a recording medium are provided upstream and downstream of the conveyance roller 306. The uses of the sheet sensors 330 and 331 will be described below. In the present embodiment, the sheet sensors 330 and 331 are optical sensors. However, this is not restrictive. For example, the sheet sensors 330 and 331 may be flag sensors.

The image signal output from the reading apparatus 202 is input to an optical scanning device 311 which includes a semiconductor laser and a polygonal mirror. An outer peripheral surface of a photosensitive drum 309 is charged by a charging device 310. After the outer peripheral surface of the photoelectric drum 309 is charged, laser light according to the image signal input from the reading apparatus 202 to the optical scanning device 311 is projected from the optical scanning device 311 onto the outer peripheral surface of the photoelectric drum 309 via the polygonal mirror, a mirror 312, and a mirror 313. As a result, an electrostatic latent image is formed on the outer peripheral surface of the photosensitive drum 309.

The electrostatic latent image is then developed with toner in a developing device 314, whereby a toner image is formed on the outer peripheral surface of the photosensitive drum 309. The toner image formed on the photosensitive drum 309 is transferred to a recording medium by a transfer charging device 315 which is arranged in a position (transfer position) opposed to the photosensitive drum 309. The registration roller 308 feeds the recording medium into the transfer position in synchronization with timing at which the transfer charging device 315 transfers the toner image to the recording medium.

The recording medium to which the toner image is transferred as described above is fed into a fixing device 318 by a conveyance belt 317. The fixing device 318 applies heat and pressure to the recording medium, whereby the toner image is fixed to the recording medium. In such a manner, the image forming apparatus 100 forms an image on a recording medium.

If an image is formed in a one-sided printing mode, the recording medium having passed through the fixing device 318 is discharged to a discharge tray (not illustrated) by discharge rollers 319 and 324. If an image is formed in a two-sided printing mode, the recording medium on a first side of which fixing is performed by the fixing device 318 is then conveyed to a reversing path 325 by the discharge roller 319, a conveyance roller 320, and a reversing roller 321. The recording medium is then conveyed to the registration roller 308 again by conveyance rollers 322 and 323, and an image is formed on a second side of the recording medium by the foregoing method. The recording medium is then discharged to the discharge tray (not illustrated) by the discharge rollers 319 and 324.

If the recording medium having an image formed on its first side is discharged out of the image forming apparatus 100 facedown, the recording medium having passed through the fixing device 318 passes through the discharge roller 319 and is conveyed toward the conveyance roller 320. Immediately before the trailing edge of the recording medium passes through a nip portion of the conveyance roller 320, rotation of the conveyance rollers 320 is reversed. The recording medium is thereby discharged out of the image forming apparatus 100 via the discharge roller 324 with the first side of the recording medium down.

The configuration and functions of the image forming apparatus 100 have been described above. In the present embodiment, a load refers to an object to be driven by a motor. For example, various rollers (conveyance rollers) including the feed rollers 204, 303, 305, the registration roller 308, and the discharge roller 319, the photosensitive drum 309, the conveyance belts 208 and 317, the illumination system 209, and the optical system correspond to loads according to the present embodiment. The motor control device according to the present embodiment may be employed for the motors for driving such loads.

Figure 3:
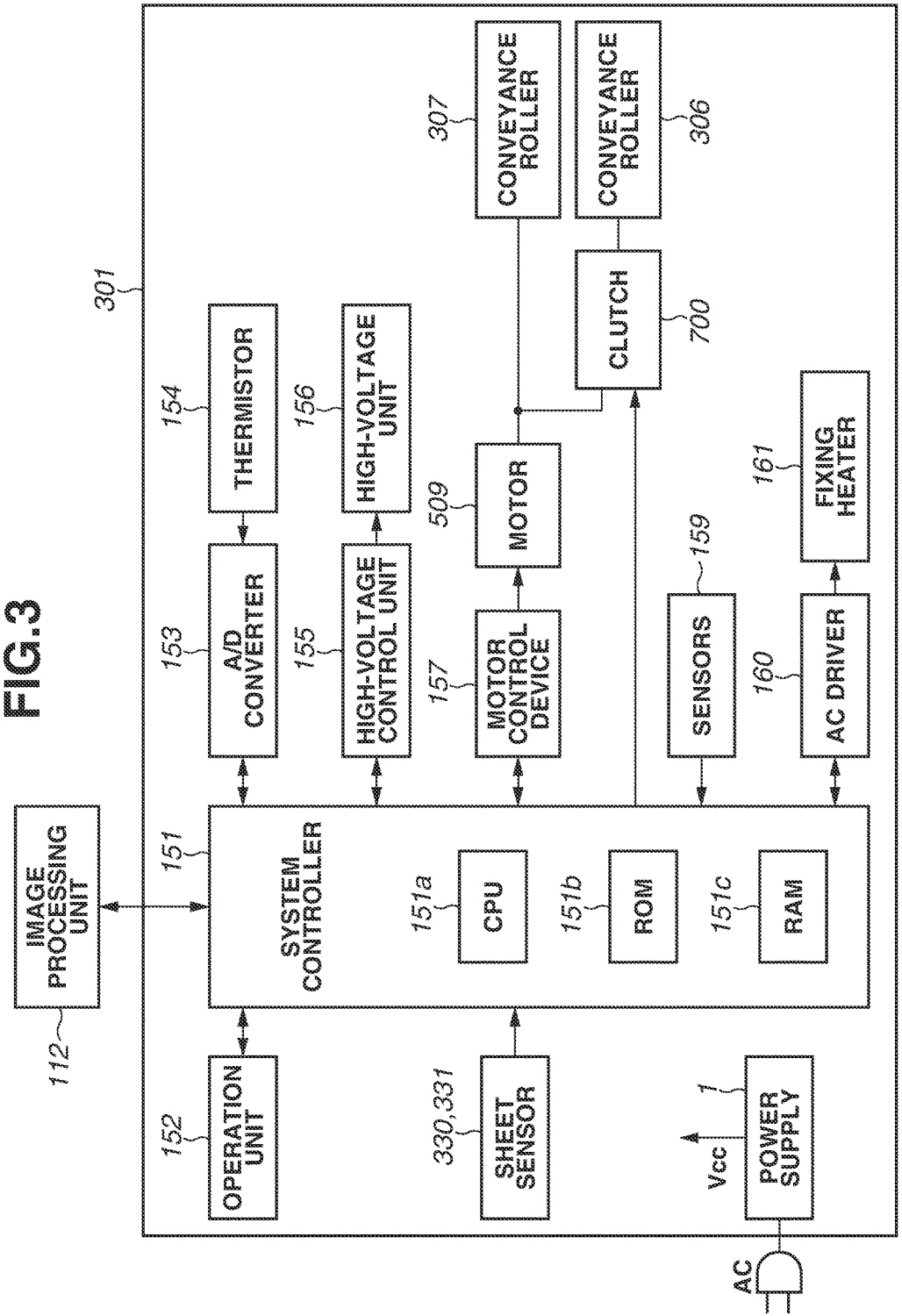
FIG. 3 is a block diagram illustrating a control configuration of the image forming apparatus.

FIG. 3 is a block diagram illustrating an example of a control configuration of the image forming apparatus 100. As illustrated in FIG. 3, the image forming apparatus 100 includes a power supply 1. The power supply 1 is connected to an alternating-current (AC) power source. Various devices in the image forming apparatus 100 operate depending on power output from the power supply 1. As illustrated in FIG. 3, a system controller 151 includes a central processing unit (CPU) 151a, a read-only memory (ROM) 151b, and a random access memory (RAM) 151c. The system controller 151 is connected with an image processing unit 112, an operation unit 152, an analog-to-digital (A/D) converter 153, a high-voltage control unit 155, a motor control device 157, a clutch 700, the sheet sensors 330 and 331, sensors 159, and an AC driver 160. The system controller 151 can transmit and receive data and commands to/from the connected units.

The CPU 151a reads and executes various programs stored in the ROM 151b, and thereby executes various sequences related to a predetermined image forming sequence.

The RAM 151c is a storage device. The RAM 151c stores various types of data, such as a setting value for the high-voltage control unit 155, a command value for the motor control device 157, and information received from the operation unit 152.

The system controller 151 transmits setting value data on various devices included in the image forming apparatus 100 to the image processing unit 112. The setting value data is needed for image processing of the image processing unit 112. The system controller 151 further receives signals from the sensors 159, and sets the setting value of the high-voltage control unit 155 based on the received signals.

The high-voltage control unit 155 reads the setting value set by the system controller 151 from the RAM 151c, and supplies a needed voltage to a high-voltage unit 156 (such as the charging device 310, the developing device 314, and the transfer charging device 315).

As illustrated in FIG. 3, a motor 509 according to the present embodiment drives a plurality of loads. Specifically, for example, the motor 509 drives the conveyance roller 307 and the conveyance roller 306. The motor 509 and the conveyance roller 306 are connected and separated by the clutch 700. In other words, the clutch 700 functions as a connection member. If the motor 509 and the conveyance roller 306 are connected by the clutch 700, the motor 509 can drive the conveyance rollers 307 and 306. If the motor 509 and the conveyance roller 306 are separated, the motor 509 drives only the conveyance roller 307. The connection and separation of the clutch 700 are performed in a state where a rotor of the motor 509 rotates at a predetermined speed (constant speed). The clutch 700 according to the present embodiment is an electromagnetic clutch which performs connection and separation by electromagnetic force. However, this is not restrictive. The clutch 700 may have any configuration for connecting and separating the motor 509 and the load to transmit the driving force of the motor 509 to the load.

The system controller 151 controls the clutch 700 based on detection results of the sheet sensors 330 and 331. The clutch 700 connects and separates the motor 509 and the conveyance roller 306 according to a signal output from the CPU 151a.

The motor control device 157 controls the motor 509 according to a command output from the CPU 151a. In FIG. 3, the motor 509 is configured to drive the conveyance rollers 306 and 307. However, this is not restrictive. For example, the motor 509 may be configured to drive not only the conveyance roller 306 and 307 but also other loads. In FIG. 3, only the motor 509 is illustrated as a motor for driving loads. In fact, the image forming apparatus 100 includes a plurality of motors. One motor control device may be configured to control a plurality of motors. While there is provided only one motor control device in FIG. 3, the image forming apparatus 100 may in fact include a plurality of motor control devices.

The power supply 1 supplies a voltage Vcc to a full-bridge circuit 50 included in the motor control device 157. The full-bridge circuit 50 will be described below.

The A/D converter 153 receives a signal detected by a thermistor 154 for detecting temperature of a fixing heater 161. The A/D converter 153 converts the detection signal from an analog signal into a digital signal, and transmits the digital signal to the system controller 151. The system controller 151 controls the AC driver 160 based on the digital signal received from the A/D converter 153. The AC driver 160 controls the fixing heater 161 such that the fixing heater 161 has temperature needed to perform fixing. The fixing heater 161 is used for fixing and is included in the fixing device 318.

The system controller 151 controls the operation unit 152 to display an operation screen on a display unit provided on the operation unit 152. A user sets in the operation screen a type (sheet type) of recording medium to be used. The system controller 151 receives information set by the user from the operation unit 152, and controls an operation sequence of the image forming apparatus 100 based on the information set by the user. The system controller 151 transmits information indicating a state of the image forming apparatus 100 to the operation unit 152. Examples of the information indicating the state of the image forming apparatus 100 include information about the number of images to be formed, a state of progress of an image forming operation, and a sheet jam or double feeding in the image printing apparatus 301 and the document feeding apparatus 201. The operation unit 152 displays the information received from the system controller 151 on the display unit.

In such a manner, the system controller 151 controls the operation sequence of the image forming apparatus 100.

[Motor Control Device]

Next, the motor control device 157 according to the present embodiment will be described. The motor control device 157 according to the present embodiment controls the motor 509 by vector control.

<Vector Control>

A method by which the motor control device 157 according to the present embodiment performs vector control will initially be described with reference to FIGS. 4 and 5. In the following description, the motor 509 is described to include no sensor such as a rotary encoder for detecting a rotation phase of the rotor of the motor 509. However, the motor 509 may be configured to include a sensor such as a rotary encoder.

Figure 4:
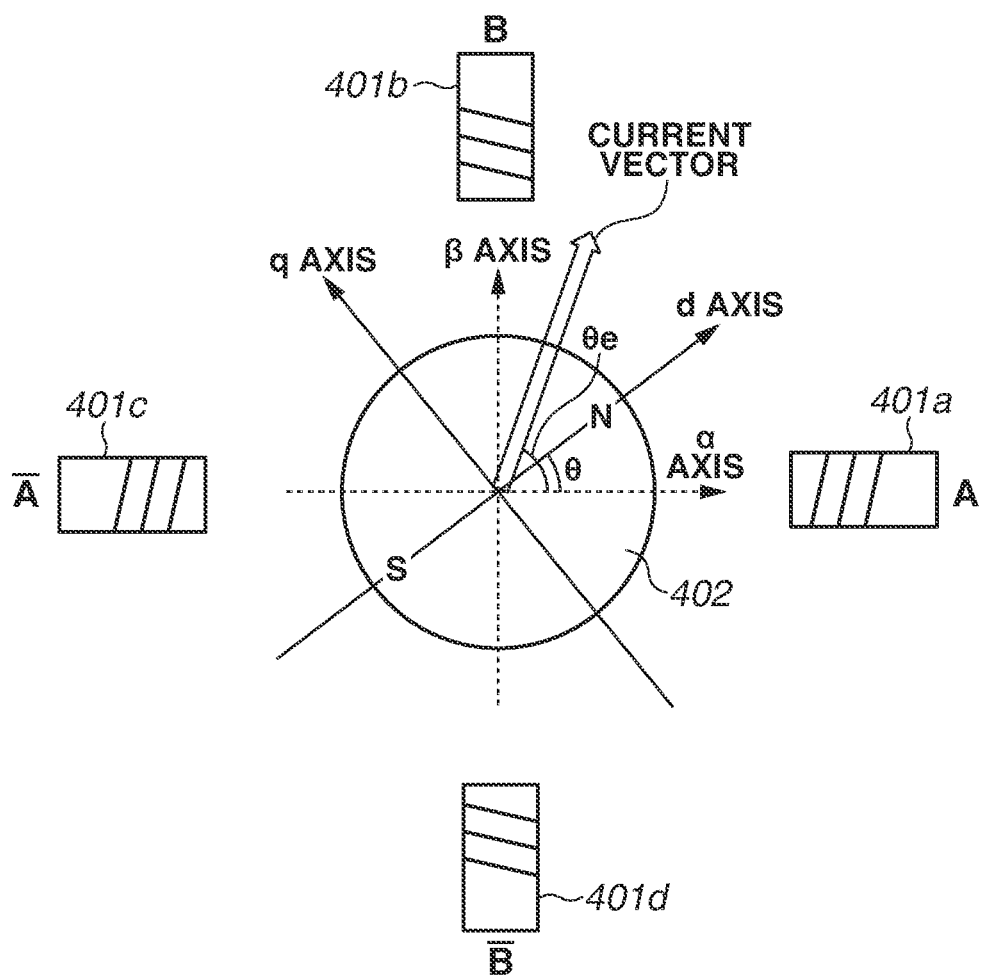
FIG. 4 is a diagram illustrating a relationship of a motor having two phases, an A phase and a B phase, with a d-axis and a q-axis of a rotating coordinate system.

FIG. 4 is a diagram illustrating a relationship between a stepping motor (hereinafter, referred to as a motor) 509 having two phases, an A phase (first phase) and a B phase (second phase), and a rotating coordinate system expressed by a d-axis and a q-axis. In FIG. 4, an α-axis and a β-axis are defined in a stationary coordinate system. The α-axis corresponds to the windings of the A phase. The β-axis corresponds to the windings of the B phase. In FIG. 4, the d-axis is defined along a direction of a magnetic flux generated by the poles of a permanent magnet used in a rotor 402. The q-axis is defined along a direction 90° leading the d-axis counterclockwise (direction orthogonal to the d-axis). An angle formed between the α-axis and the d-axis is defined as θ. The rotation phase of the rotor 402 is expressed by the angle θ. The vector control uses a rotating coordinate system with reference to the rotation phase θ of the rotor 402. Specifically, the vector control uses current components, in the rotating coordinate system, of a current vector corresponding to the driving currents flowing through the windings, namely, a q-axis component (torque current component) which generates torque on the rotor 402 and a d-axis component (exciting current component) which affects the intensity of a magnetic flux passing through the windings.

Vector control is a method of controlling a motor by phase feedback control of controlling the value of the torque current component and that of the exciting current component such that a deviation between a command phase indicating the target phase of the rotor and an actual rotation phase decreases. Another method of controlling a motor is to perform speed feedback control of controlling the value of the torque current component and that of the exciting current component such that a deviation between a command speed indicating the target speed of the rotor and an actual rotation speed decreases.

Figure 5:
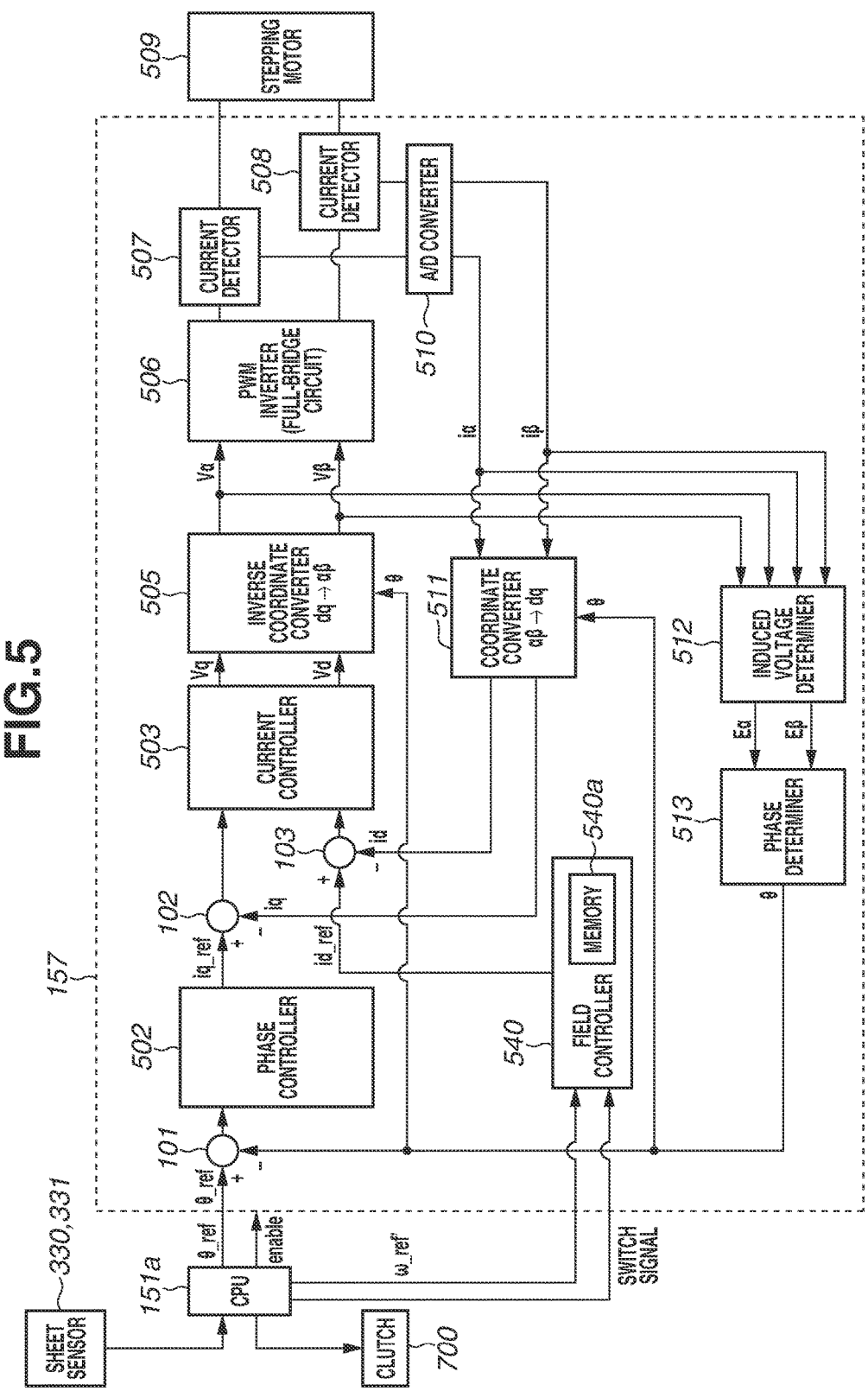
FIG. 5 is a block diagram illustrating a configuration of a motor control device according to the first embodiment.

FIG. 5 is a block diagram illustrating an example of a configuration of the motor control device 157 which controls the motor 509. The motor control device 157 includes at least one ASIC and performs functions to be described below.

As illustrated in FIG. 5, the motor control device 157 includes a phase controller 502, a current controller 503, an inverse coordinate converter 505, a coordinate transformer 511, and a pulse width modulation (PWM) inverter 506 as circuits for vector control. The PWM inverter 506 supplies the driving currents to the windings of the motor 509. The coordinate converter 511 converts the coordinates of the current vector corresponding to the driving currents flowing through the windings of the A and B phases of the motor 509 from the stationary coordinate system expressed by the α- and β-axes into the rotating coordinate system expressed by the q- and d-axes. As a result, the driving currents flowing through the winding are expressed by the current value of the q-axis component (q-axis current) and the current value of the d-axis component (d-axis current), which are current values in the rotating coordinate system. The q-axis current corresponds to the torque current that generates torque on the rotor 402 of the motor 509. The d-axis current corresponds to the exciting current that affects the intensity of the magnetic flux passing through the windings of the motor 509, and does not contribute to generation of torque on the rotor 402. The motor control device 157 can control each of the q- and d-axes currents independently. The motor control device 157 can thus efficiently generate torque needed for the rotor 402 to rotate by controlling the q-axis current according to load torque acting on the rotor 402. In other words, in the vector control, the magnitude of the current vector illustrated in FIG. 3 changes depending on the load torque acting on the rotor 402.

The motor control device 157 determines the rotation phase θ of the rotor 402 of the motor 509 by a method to be described below, and performs vector control based on the determination result. The CPU 151a generates a command phase θ_ref indicating the target phase of the rotor 402 of the motor 509, and outputs the command phase θ_ref to the motor control device 157.

A subtractor 101 calculates a deviation between the rotation phase θ of the rotor 402 of the motor 509 and the command phase θ_ref, and outputs the deviation to the phase controller 502 at predetermined time periods T (for example, 200 µs).

The phase controller 502 generates and outputs a q-axis current command value (target value) iq_ref so that the deviation output from the subtractor 101 decreases, based on proportional (P) control, integral (I) control, and derivative (D) control. Specifically, the phase controller 502 generates and outputs the q-axis current command value iq_ref such that the deviation output from the subtractor 101 becomes zero, based on P control, I control, and D control. P control refers to a method of controlling the value to be controlled based on a value proportional to a deviation between the command value and an estimated value. I control refers to a method of controlling the value to be controlled based on a value proportional to a time integral of the deviation between the command value and the estimated value. D control refers to a method of controlling the value to be controlled based on a value proportional to a temporal change of the deviation between the command value and the estimated value. In the present embodiment, the phase controller 502 generates the q-axis current command value iq_ref based on PID control. However, this is not restrictive. For example, the phase controller 502 may generate the q-axis current command value iq_ref based on PI control.

The driving currents flowing through the windings of the A and B phases of the motor 509 are detected by current detectors 507 and 508, and then converted from analog values into digital values by an A/D converter 510. In the present embodiment, for example, the A/D converter 510 outputs the digital values at periods (e.g., 25 microseconds (µs)) shorter than the periods T at which the subtractor 101 outputs the deviation to the phase controller 502. However, this is not restrictive.

The current values of the driving currents, converted from analog values into digital values by the A/D converter 510, are expressed as current values iα and iβ in the stationary coordinate system by the following equations, using a phase θe of the current vector illustrated in FIG. 4:

$$i\alpha = I^* \cos \theta e, \text{ and} \quad (1)$$

$$i\beta = I^* \sin \theta e. \quad (2)$$

The phase θe of the current vector is defined as an angle formed between the α-axis and the current vector. I represents the magnitude of the current vector.

The current values iα and iβ are input to the coordinate converter 511 and an induced voltage determiner 512.

The coordinate converter 511 converts the current values iα and iβ in the stationary coordinate system into a current value iq of the q-axis current and a current value id of the d-axis current in the rotating coordinate system by the following equations:

$$id = \cos \theta^* i\alpha + \sin \theta^* i\beta, \text{ and} \quad (3)$$

$$iq = -\sin \theta^* i\alpha + \cos \theta^* i\beta. \quad (4)$$

The q-axis current command value iq_ref output from the phase controller 502 and the current value iq output from the coordinate converter 511 are input to a subtractor 102. The subtractor 102 calculates a deviation between the q-axis current command value iq_ref and the current value iq, and outputs the deviation to the current controller 503.

A d-axis current command value (target value) id_ref output from a field controller 540 and the current value id output from the coordinate converter 511 are input to a subtractor 103. The subtractor 103 calculates a deviation between the d-axis current command value id_ref and the current value id, and outputs the deviation to the current controller 503. The field controller 540 will be described below.

The current controller 503 generates driving voltages Vq and Vd such that both the input deviations decrease, based on PID control. Specifically, the current controller 503 generates the driving voltages Vq and Vd such that both the deviations become zero, and outputs the driving voltages Vq and Vd to the inverse coordinate converter 505. In other words, the current controller 503 functions as a generation unit. In the present embodiment, the current controller 503 generates the driving voltages Vq and Vd based on PID control. However, this is not restrictive. For example, the current controller 503 may generate the driving voltages Vq and Vd based on PI control.

The inverse coordinate converter 505 inversely converts the driving voltages Vq and Vd in the rotating coordinate system, output from the current controller 503, into driving voltages Vα and Vβ in the stationary coordinate system by the following equations:

$$V\alpha = \cos \theta^* Vd - \sin \theta^* Vq, \text{ and} \quad (5)$$

$$V\beta = \sin \theta^* Vd + \cos \theta^* Vq. \quad (6)$$

The inverse coordinate converter 505 outputs the inversely-converted driving voltages Vα and Vβ to the induced voltage determiner 512 and the PWM inverter 506.

Figure 6:
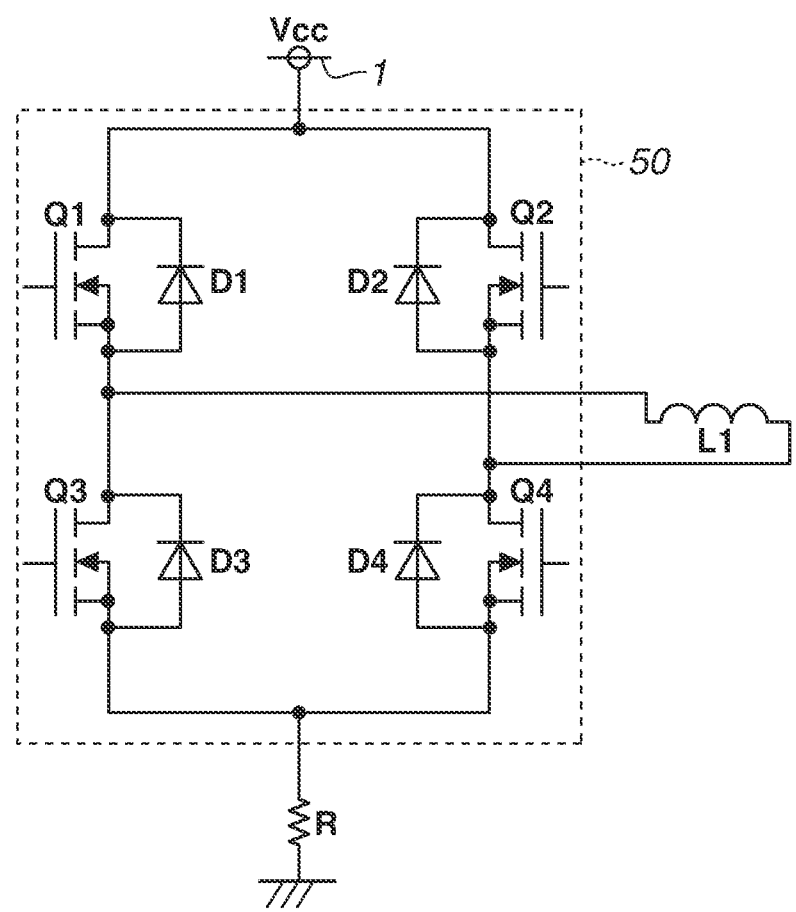
FIG. 6 is a diagram illustrating a configuration of a full-bridge circuit included in a pulse width modulation (PWM) inverter.

The PWM inverter 506 includes the full-bridge circuit 50. FIG. 6 is a diagram illustrating an example of a configuration of the full-bridge circuit 50 included in the PWM inverter 506. As described above, the voltage Vcc is supplied from the power supply 1 to the full-bridge circuit 50. The full-bridge circuit 50 includes field-effect transistors (FETs) Q1 to Q4 serving as switching elements. A winding L1 of the motor 509 is connected to the full-bridge circuit 50.

The FETs Q1 to Q4 are driven by PWM signals based on the driving voltages Vα and Vβ input from the inverse coordinate converter 505. As a result, a voltage is applied to the winding L1 from the power supply 1. The driving currents iα and iβ according to the driving voltages Vα and Vβ are thus supplied to the winding L1. In other words, the PWM inverter 506 functions as a supply unit. In the present embodiment, the PWM inverter 506 includes the full-bridge circuit 50. However, the PWM inverter 506 may include a half-bridge circuit. The full-bridge circuit 50 is provided for each of the A and B phases of the motor 509. In the present embodiment, one power supply is provided for each of the A and B phases. However, this is not restrictive. The winding L1 in FIG. 6 is in fact a winding included in the motor 509.

Next, a method of determining the rotation phase θ will be described. The rotation phase θ of the rotor 402 is determined by using the values of induced voltages Eα and Eβ which are induced in the windings of the A and B phases of the motor 509 by rotation of the rotor 402. The values of the induced voltages Eα and Eβ are determined (calculated) by the induced voltage determiner 512. Specifically, the induced voltages Eα and Eβ are determined based on the current values iα and iβ input from the A/D converter 510 to the induced voltage determiner 512 and the driving voltages Vα and Vβ input from the inverse coordinate converter 505 to the induced voltage determiner 512, by using the following equations:

$$E\alpha = V\alpha - R^{*}i\alpha - L^{*}di\alpha/dt, \text{ and} \qquad (7)$$

$$E\beta = V\beta - R^{*}i\beta - L^{*}di\beta/dt. \qquad (8)$$

R is a winding resistance, and L is a winding inductance. The values of the winding resistance R and the winding inductance L are inherent to the motor 509 in use, and stored in advance in the ROM 151b or a memory (not illustrated) included in the motor control device 157.

The induced voltages Eα and Eβ determined by the induced voltage determiner 512 are output to a phase determiner 513.

Based on a ratio between the induced voltages Eα and Eβ output from the induced voltage determiner 512, the phase determiner 513 determines the rotation phase θ of the rotor 402 of the motor 509 by the following equation:

$$\theta = \tan\hat{0} - 1(-E\beta/E\alpha). \qquad (9)$$

In the present embodiment, the phase determiner 513 determines the rotation phase θ by calculation based on equation (9). However, this is not restrictive. For example, the phase determiner 513 may determine the rotation phase θ by referring to a table showing a relationship between the induced voltages Eα and Eβ and the rotation phase θ corresponding to the induced voltages Eα and Eβ, stored in the ROM 151b.

The rotation phase θ of the rotor 402 determined as described above is input to the subtractor 101, the inverse coordinate converter 505, and the coordinate converter 511.

The motor control device 157 repeats the foregoing control.

As described above, the motor control device 157 according to the present embodiment performs vector control using phase feedback control for controlling the current values in the rotating coordinate system such that the deviation between the command phase θ_ref and the rotation phase θ decreases. By the vector control, the motor control device 157 can suppress step-out of the motor 509 and an increase in motor noise and power consumption due to surplus torque. The phase feedback control controls the rotation phase θ of the rotor 402 such that the rotation phase θ of the rotor 402 becomes a desired phase. The image forming apparatus 100 thus applies vector control using phase feedback control to the motor 509 that drives a load for which the rotation phase θ of the rotor 402 needs to be accurately controlled (for example, registration roller 308), whereby an appropriate image formation is performed on a recording medium.

[Field Weakening]

Next, field weakening will be described. As mentioned above, the rotation of the rotor 402 generates an induced voltage in the winding of each phase of the motor 509. The generation of the induced voltages in the windings of the motor 509 reduces the voltages applicable to the windings of the motor 509 (hereinafter, referred to as usable voltages). Specifically, suppose, for example, that the voltage value output from the power supply 1 is Vcc. Due to the generation of the induced voltages in the windings of the respective phases, usable voltages Vα' and Vβ' are limited to values given by the following equations (10) and (11):

$$V\alpha' = Vcc - e\alpha, \text{ and} \qquad (10)$$

$$V\beta' = Vcc - e\beta. \qquad (11)$$

Here, eα represents the amplitude of the induced voltage Eα which changes sinusoidally, and eβ represents the amplitude of the induced voltage Eβ which changes sinusoidally.

The amplitude e of the induced voltage generated in the winding of each phase by the rotation of the rotor 402 increases when the rotation speed of the rotor 402 increases. In other words, the higher the rotation speed of the rotor 402, the lower the usable voltage. When the usable voltage decreases, torque T that can be given to the rotor 402 also decreases.

The induced voltages are generated by a change in the magnetic flux passing through the windings. An increase in the magnitude of the induced voltages occurring in the windings can thus be suppressed by controlling the exciting current component in such a way that a magnetic flux weaker than that of the rotor 402 passes through the windings. Specifically, if the exciting current component is controlled so as to be a negative value, the intensity of the magnetic flux of the rotor 402 is apparently weakened, whereby a magnetic flux weaker than that of the rotor 402 can be made to pass through the windings. This can suppress an increase in the magnitude of the induced voltages occurring in the windings, and can suppress a decrease in the usable voltages Vα' and Vβ'. As a result, a reduction in possible output torque can be suppressed. Such a technique is referred to as field weakening. The greater the absolute value of the negative value of the exciting current component, the more a reduction in the possible output torque can be suppressed.

Next, field weakening in the present embodiment will be described. In the present embodiment, the motor 509 is efficiently controlled by the application of the following configuration to the motor control device 157.

The motor control device 157 according to the present embodiment performs field weakening if the following two conditions are satisfied.

<Condition 1 for Performing Field Weakening>

The first condition for performing field weakening will initially be described.

Figure 7:
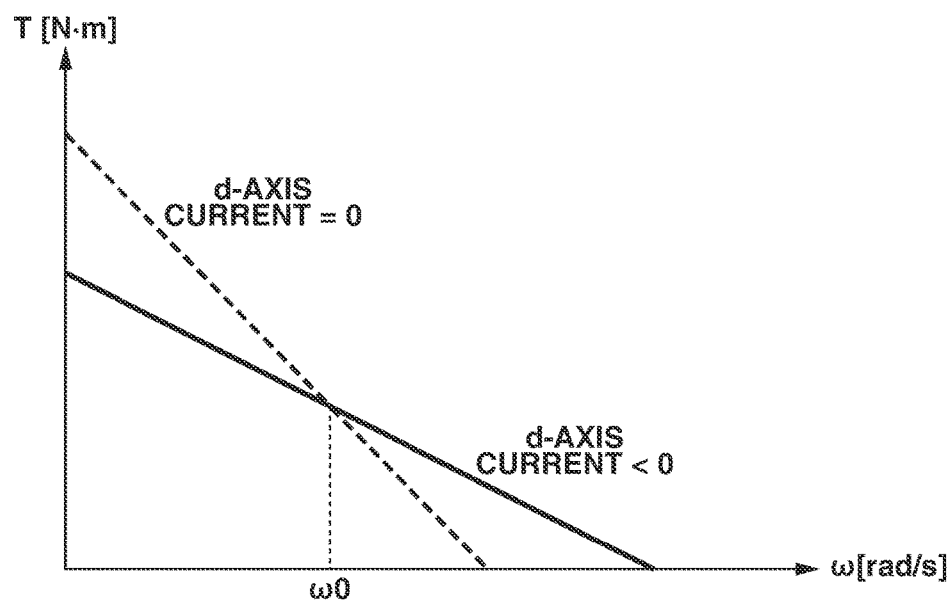
FIG. 7 is a graph illustrating a relationship between torque T and a rotation speed of a rotor.

FIG. 7 is a graph illustrating a relationship between the torque T and a rotation speed ω of the rotor 402. FIG. 7 illustrates a torque T-rotation speed ω characteristic (broken line) when the d-axis current is controlled to be zero and the torque T-rotation speed ω characteristic (full line) when the d-axis current is controlled to have a negative value. The torque T-rotation speed ω characteristics illustrated in FIG. 7 are mere examples in the present embodiment, and are not restrictive.

As illustrated in FIG. 7, if the rotation speed ω is less than ω0 (ω<ω0), the torque T when the d-axis current is controlled to be zero is higher than the torque T when the d-axis current is controlled to have a negative value. In other words, if the rotation speed ω is less than ω0 (ω<ω0), higher torque can be given to the rotor 402 without field weakening than with field weakening.

As illustrated in FIG. 7, if the rotation speed ω is higher than ω0 (ω>ω0), the torque T when the d-axis current is controlled to have a negative value is higher than the torque T when the d-axis current is controlled to be zero. In other words, if the rotation speed ω is higher than ω0 (ω>ω0), higher torque can be given to the rotor 402 with field weakening than without field weakening.

As described above, if the rotation speed ω is less than ω0 (ω<ω0), higher torque can be given to the rotor 402 without field weakening than with field weakening. If the rotation speed ω is higher than ω0 (ω>ω0), higher torque can be given to the rotor 402 with field weakening than without field weakening.

In the present embodiment, the first condition for performing field weakening is therefore that the rotation speed ω of the rotor 402 is ω0 or more.

As illustrated in FIG. 5, in the present embodiment, the CPU 151*a* calculates a rotation speed ω_ref to substitute for a command speed ω_ref based on the amount of change in the command phase θ_ref in a predetermined period, and outputs the rotation speed ω_ref to the field controller 540. The rotation speed ω_ref is calculated by using the following equation (12):

$$\omega = d\theta/dt. \quad (12)$$

The field controller 540 determines whether the rotation speed ω_ref satisfies the following expression (13):

$$\omega\_ref \geq \omega th, \quad (13)$$

where ωth (=ω0) is a speed threshold which is stored in the memory 540*a*.

However, if expression (13) is the only condition for performing field weakening, an unneeded current can be supplied to the windings as described above in a period when the motor 509 and the conveyance roller 306 are not connected. This results in increased power consumption.

<Condition 2 for Performing Field Weakening>

Next, the second condition for performing field weakening will be described.

As described above, in a period when the rotor 402 rotates at a predetermined speed, the load torque during a period in which the motor 509 and the conveyance roller 306 are connected is higher than the load torque during a period in which the motor 509 and the conveyance roller 306 are not connected. In other words, higher torque T is needed during the period in which the motor 509 and the conveyance roller 306 are connected than during the period in which the motor 509 and the conveyance roller 306 are not connected.

As described in FIG. 2, the sheet sensor 330 for detecting the presence or absence of a recording medium is provided in a predetermined position upstream of the conveyance roller 306 in the conveyance direction in which the recording medium is conveyed. The sheet sensor 331 for detecting the presence or absence of a recording medium is provided in a second predetermined position downstream of the conveyance roller 306 in the conveyance direction. The detection results of the sheet sensors 330 and 331 are input to the CPU 151*a*.

In the present embodiment, if the sheet sensor 330 detects the leading edge of a recording medium (the leading edge of the recording medium reaches the sheet sensor 330), the motor control device 157 starts field weakening. When a predetermined time t_on has elapsed from the detection of the leading edge of the recording medium by the sheet sensor 330, the CPU 151*a* controls the clutch 700 to connect the motor 509 and the conveyance roller 306. As a result, the motor 509 and the conveyance roller 306 are connected with each other. If the trailing edge of the recording medium passes the sheet sensor 331 (the recording medium stops being detected by the sheet sensor 331), the CPU 151*a* controls the clutch 700 to separate the motor 509 and the conveyance roller 306. As a result, the motor 509 and the conveyance roller 306 are separated from each other. When a predetermined time t_off has elapsed from the passing of the trailing edge of the recording medium by the sheet sensor 331, the motor control device 157 ends the field weakening. In other words, field weakening is performed in a period when the motor 509 and the conveyance roller 306 are connected. Field weakening is not performed in a period when the motor 509 and the conveyance roller 306 are not connected. This can suppress an increase in power consumption due to the setting of the value of the exciting current component to a value other than zero.

<Specific Method of Performing Field Weakening>

Next, a specific method of performing field weakening will be described.

Figure 8:
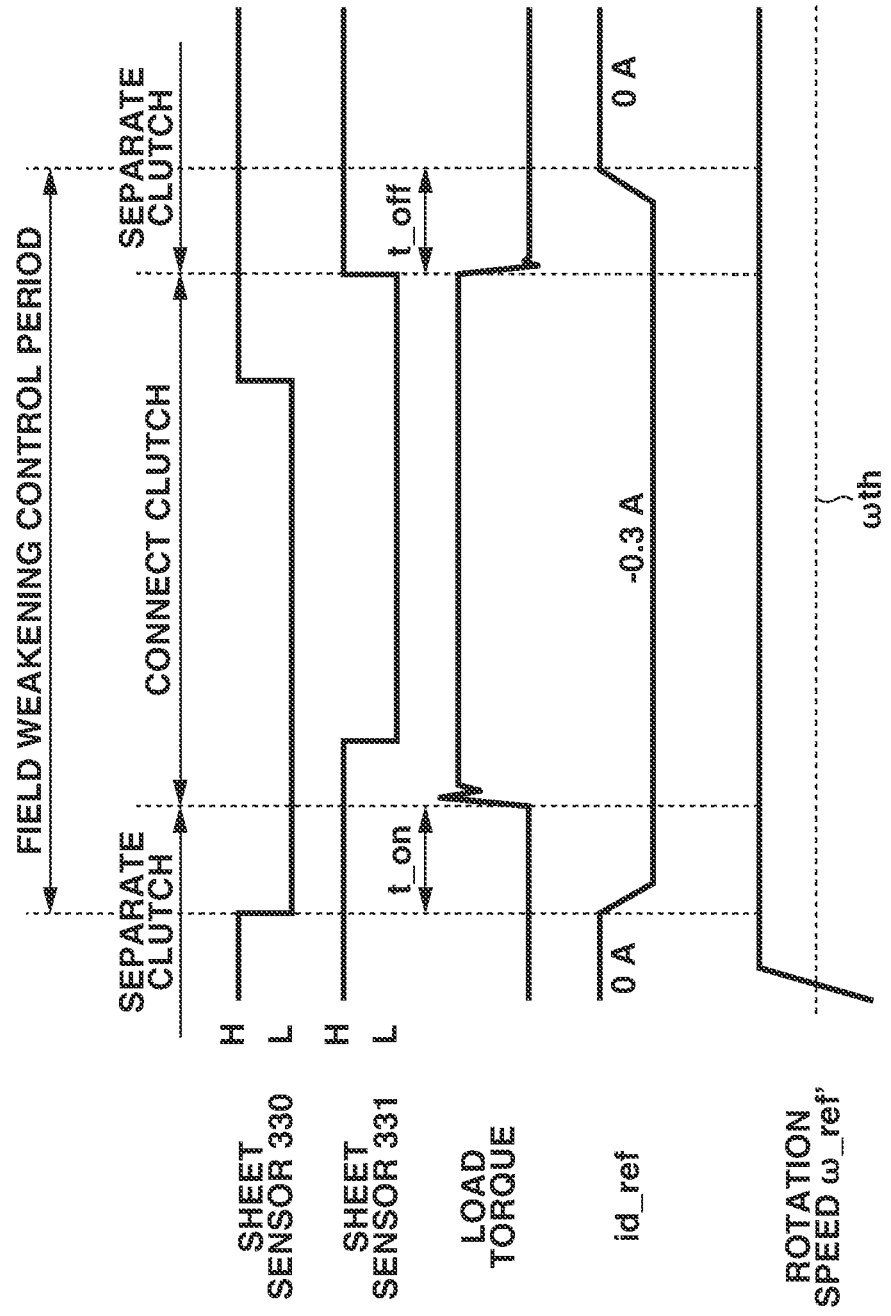
FIG. 8 is a diagram illustrating a time chart of field weakening control according to the first embodiment.

FIG. 8 is a diagram illustrating a time chart of field weakening control according to the present embodiment. During a period before the sheet sensor 330 detects the leading edge of a recording medium (period in which the sheet sensor 330 is 'H (high level)') in a period in which the rotation speed ω_ref of the rotor 402 is ωth or more, the field controller 540 outputs 0 A as the d-axis current command value id_ref. In other words, field weakening is not performed.

If the sheet sensor 330 then detects the leading edge of a recording medium (the sheet sensor 330 changes from 'H' to 'L (low level)') in a state in which the rotation speed ω_ref is a predetermined speed, the CPU 151*a* outputs a signal for switching the value of the d-axis current command value id_ref to the field controller 540. According to the switch signal, the field controller 540 switches the d-axis current command value id_ref to a negative value (for example, −0.3 A) by gradually changing the d-axis current command value to be output from 0 A. As a result, field weakening is performed. The d-axis current command value id_ref is set to a predetermined value such that even if a recording medium (such as thick paper) that causes a maximum increase in load torque, among conveyable types of recording media is conveyed, the load torque will not exceed the possible output torque.

If the set value of the d-axis current command value id_ref is negative and has too large an absolute value, the magnetic field occurring from the permanent magnet serving as the rotor 402 is weakened so excessively that the resulting torque occurring on the rotor 402 becomes low. If the set value of the d-axis current command value id_ref is negative and has an absolute value close to zero, the magnetic field occurring from the permanent magnet serving as the rotor 402 fails to be weakened and, as a result, the induced voltages occurring in the windings fail to be reduced. In view of the foregoing, the negative value is determined in advance based on experiments. The d-axis current command value id_ref is stored in the memory 540a. The field controller 540 outputs the value stored in the memory 540a as the d-axis current command value id_ref.

When the predetermined time t_on has elapsed from the detection of the leading edge of the recording medium by the sheet sensor 330, the CPU 151a controls the clutch 700 to connect the motor 509 and the conveyance roller 306. As a result, the motor 509 and the conveyance roller 306 are connected with each other.

If the recording medium is conveyed by the conveyance roller 306, the sheet sensor 331 detects the leading edge of the recording medium (the sheet sensor 331 changes from 'H' to 'L'). If the recording medium is further conveyed and the trailing edge of the recording medium passes the sheet sensor 331 (the sheet sensor 331 changes from 'L' to 'H'), the CPU 151a controls the clutch 700 to separate the motor 509 and the conveyance motor 306. As a result, the motor 509 and the conveyance roller 306 are separated from each other.

When the predetermined time t_off has elapsed from the passing of the trailing edge of the recording medium by the sheet sensor 331, the CPU 151a outputs the switch signal to the field controller 540. According to the switch signal, the field controller 540 switches the d-axis current command value id_ref to be output to 0 A by gradually changing the d-axis current command value id_ref from the negative value (for example, −0.3 A). As a result, field weakening ends.

The CPU 151a then repeats the foregoing control.

In the present embodiment, it is defined by the sequence of the image forming operation in advance to perform the connection and separation of the clutch 700 in a state where the rotation speed ω of the rotor 402 is a predetermined speed. In other words, it is defined by the sequence of the image forming operation in advance not to perform the connection or separation of the clutch 700 while the rotor 402 is accelerating or decelerating. In the present embodiment, the d-axis current command value during the acceleration and deceleration of the rotor 402 is therefore zero.

The sheet sensor 330 is arranged in a position as close to the conveyance roller 306 as possible. This can reduce as much as possible the period in which field weakening is performed, and can suppress an increase in power consumption. However, if the sheet sensor 330 is too close to the conveyance roller 306, the d-axis current command value id_ref may fail to be switched in time for the connection of the motor 509 and the conveyance roller 306. As a result, the load torque can exceed the possible output torque. The arranged position of the sheet sensor 330 and the predetermined time t_on are therefore set such that the d-axis current command value id_ref can be switched in time for the connection of the motor 509 and the conveyance roller 306. The predetermined time t_on is stored in the ROM 151b in advance.

The predetermined time t_off is set to as short a time as possible. This can reduce as much as possible the period in which field weakening is performed, and can suppress an increase in power consumption. However, if the predetermined time t_off is too short, field weakening may be ended in a state where a change in the load torque occurring and acting on the rotor 402 due to the separation of the motor 509 and the conveyance roller 306 is relatively large. As a result, the load torque can exceed the possible output torque. The arranged position of the sheet sensor 331 and the predetermined time t_off are therefore set such that field weakening will not be ended in the state where a change in the load torque occurring and acting on the rotor 402 due to the separation of the motor 509 and the conveyance roller 306 is relatively large. The predetermined time t_off is stored in the ROM 151b in advance.

Figure 9:
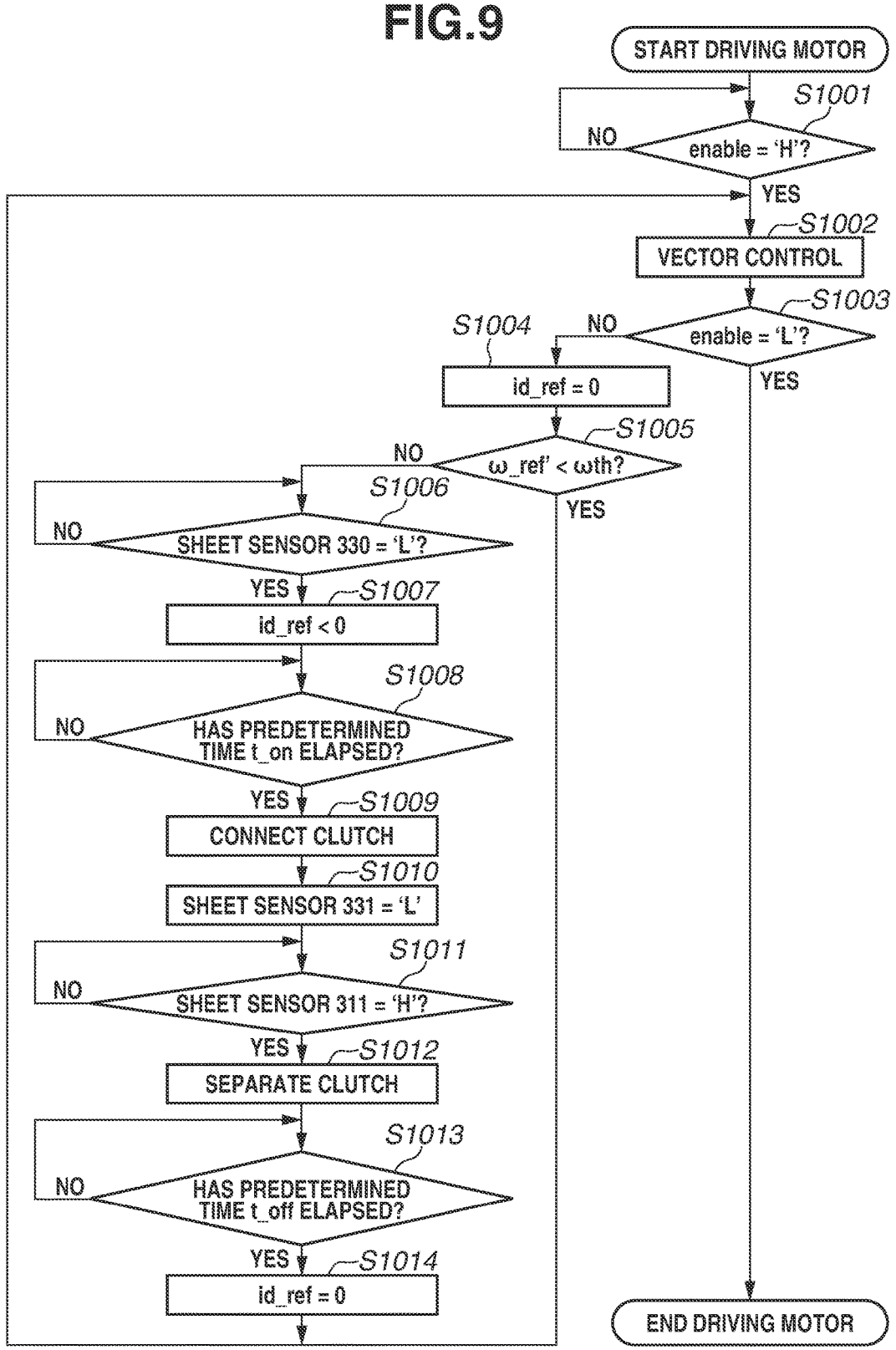
FIG. 9 is a flowchart for describing a method of the field weakening control according to the first embodiment.

FIG. 9 is a flowchart for describing a method of performing the field weakening control. The method of performing the field weakening control will be described below with reference to FIG. 9. The processing of the flowchart is executed by the CPU 151a.

In step S1001, if the CPU 151a outputs an enable signal 'H' to the motor control device 157 (YES in step S1001), the processing proceeds to step S1002. The motor control device 157 thereby starts driving control on the motor 509 based on a command output from the CPU 151a. The enable signal is a signal for enabling or disabling operation of the motor control device 157. If the enable signal is 'L' (NO in step S1001), the processing proceeds to step S1001. That is, the CPU 151a disables the operation of the motor control device 157. In other words, control of the motor 509 by the motor control device 157 is ended. If the enable signal is 'H', the CPU 151a enables the operation of the motor control device 157. The motor control device 157 performs driving control on the motor 509 based on a command output from the CPU 151a.

In step S1002, the motor control device 157 performs vector control based on a command output from the CPU 151a. In step S1003, if the CPU 151a outputs the enable signal 'L' to the motor control device 157 (YES in step S1003), the motor control device 157 ends driving the motor 509. In step S1003, if the CPU 151a outputs the enable signal 'H' to the motor control device 157 (NO in step S1003), the processing proceeds to step S1004.

In step S1004, the field controller 540 outputs 0 A as the d-axis current command value id_ref. That is, field weakening is not performed.

In step S1005, if the rotation speed ω_ref is less than a speed threshold ωth (YES in step S1005), the processing returns to step S1002 to continue vector control. Field weakening is not performed here.

In step S1005, if the rotation speed ω_ref is the speed threshold ωth or more (NO in step S1005), the processing proceeds to step S1006.

In step S1006, if the sheet sensor 330 detects the leading edge of a recording medium (YES in step S1006), the processing proceeds to step S1007. In step S1007, the CPU 151a outputs the switch signal to the field controller 540. According to the switch signal, the field controller 540 switches the d-axis current command value id_ref to be output from 0 A to a negative value (for example, −0.3 A). As a result, field weakening is performed.

In step S1008, if the predetermined time t_on has elapsed from the detection of the leading edge of the recording medium by the sheet sensor 330 (YES in step S1008), the processing proceeds to step S1009. In step S1009, the CPU 151a controls the clutch 700 to connect the motor 509 and the conveyance roller 306. As a result, the motor 509 and the conveyance roller 306 are connected with each other.

In step S1010, the sheet sensor 331 detects the leading edge of the recording medium conveyed by the conveyance roller 306, and the sheet sensor 331 becomes 'L'. In step S1011, if the trailing edge of the recording medium conveyed by the conveyance roller 306 passes the sheet sensor 331 (YES in step S1011), the processing proceeds to step S1012. In step S1012, the CPU 151a controls the clutch 700 to separate the motor 509 and the conveyance roller 306. As a result, the motor 509 and the conveyance roller 306 are separated from each other.

In step S1013, if the predetermined time t_off has elapsed from the passing of the trailing edge of the recording medium by the sheet sensor 331 (YES in step S1013), the processing proceeds to step S1014. In step S1014, the CPU 151a outputs the switch signal to the field controller 540. According to the switch signal, the field controller 540 switches the d-axis current command value id_ref to be output from the negative value (for example, −0.3 A) to 0 A. As a result, field weakening ends. The processing then returns to step S1002 to continue vector control.

The motor control device 157 subsequently repeats the foregoing control to control the motor 509 until the CPU 151a outputs the enable signal 'L' to the motor control device 157.

As described above, in the present embodiment, field weakening is performed only during a period in which field weakening is needed. Specifically, field weakening is performed only during a period in which the motor 509 and the conveyance roller 306 are connected, in a period when the rotation speed ω_ref is a predetermined speed higher than or equal to the speed threshold ωth. In the present embodiment, it is defined by the sequence of the image forming operation in advance to perform the connection and separation of the clutch 700 in a state where the rotation speed ωref of the rotor 402 is the predetermined speed. In other words, it is defined by the sequence of the image forming operation in advance not to perform the connection or separation of the clutch 700 while the rotor 402 is accelerating or decelerating. In the present embodiment, the d-axis current command value id_ref is therefore zero in a period when the rotation speed ω_ref of the rotor 402 is lower than the predetermined speed, i.e., while the rotor 402 is accelerating or decelerating. This can reduce the period during which field weakening is performed, in the period when the motor 509 is driven, and can suppress an increase in power consumption. In other words, an increase in power consumption due to the setting of the predetermined value of the exciting current component corresponding to the predetermined speed in the period in which the rotor 402 is rotated at the predetermined speed can be suppressed, and the motor 509 can be efficiently controlled.

In the present embodiment, the field controller 540 switches the d-axis current command value id_ref by gradually changing the d-axis current command value id_ref. However, this is not restrictive. For example, the field controller 540 may directly switch the d-axis current command value id_ref from 0 A to −0.3 A. The field controller 540 may directly switch the d-axis current command value id_ref from −0.3 A to 0 A.

In the present embodiment, the d-axis current command value id_ref in performing field weakening is set to −0.3 A regardless of the sheet type of the recording medium to be conveyed. However, this is not restrictive. For example, the d-axis current command value id_ref in performing field weakening may be set according to the sheet type of the recording medium to be conveyed.

In the present embodiment, the timing to control the clutch 700 is determined based on the detection results of the sheet sensors 330 and 331. However, for example, the timing may be determined based on a previously-set operation sequence of the image forming apparatus 100. The timing may be determined based on the number of pulses output to the motor 509. For example, the user may transmit an instruction to stop conveyance of the recording medium to the CPU 151a by using the operation unit 152, and the CPU 151a may perform separation control on the clutch 700 according to the instruction. Such a configuration can prevent the driving force of the motor 509 from being transmitted to the conveyance roller 306, whereby the conveyance of the recording medium can be stopped.

In the present embodiment, the d-axis current command values id_ref stored in the memory 540a are 0 A and −0.3 A. However, this is not restrictive, and three or more values may be stored. In such a case, for example, the CPU 151a outputs a signal indicating which value to use to the field controller 540. The field controller 540 switches the d-axis current command value id_ref to be output based on the signal.

In the present embodiment, field weakening is controlled based on the detection results of the sheet sensors 330 and 331. However, this is not restrictive. For example, field weakening is started when a predetermined time T1 from a start of driving of the conveyance roller 306 to predetermined timing before connection of the motor 509 and the conveyance roller 306 by the clutch 700 has elapsed. Field weakening is ended when a predetermined time T2 from the start of driving of the conveyance roller 306 to second predetermined timing after separation of the motor 509 and the conveyance roller 306 by the clutch 700 has elapsed. Such a configuration may be employed. The predetermined timing and the second predetermined timing are determined based on a previously-set operation sequence of the image forming apparatus 100. The predetermined timing and the second predetermined timing may be determined based on the number of pulses output to the motor 509.

In the present embodiment, the d-axis current command value id_ref is set to 0 A in periods other than that during which the motor 509 and the conveyance roller 306 are connected, in the period in which the rotation speed ω_ref of the rotor 402 is a predetermined speed higher than or equal to the speed threshold ωth. However, the d-axis current command value id_ref may be set to a value other than 0 A. Specifically, the d-axis current command value id_ref may be set to a value greater than the negative value that is set as the d-axis current commend value id_ref during the period in which the motor 509 and the conveyance roller 306 are connected, in the period in which the rotation speed ω_ref of the rotor 402 is the predetermined speed higher than or equal to the speed threshold ωth. In other words, the magnetic flux passing through the windings in the periods other than that during which the motor 509 and the conveyance roller 306 are connected, in the period in which the rotation speed ω_ref is the predetermined speed higher than or equal to the speed threshold ωth can be higher than the magnetic flux passing through the windings during the period in which the motor 509 and the conveyance roller 306 are connected. An increase in power consumption can be effectively suppressed by setting the d-axis current command value id_ref to a value as close to 0 A as possible.

In the present embodiment, the d-axis current command value id_ref is set to the value obtained by experiment in advance. However, this is not restrictive. For example, the field controller 540 may be configured to change the value of the d-axis current command value id_ref based on the rotation speed ω_ref of the rotor 402. Specifically, the field controller 540 may be configured such that the higher the rotation speed ω_ref, the smaller the value of the d-axis current command value id_ref is set to be. This can suppress an increase in the induced voltages occurring in the windings as the rotation speed ω_ref increases.

The d-axis current command value id_ref during field weakening is set to such a value that the rotation phase θ of the rotor 402 is accurately determined even if the induced voltages occurring in the windings decrease because of the field weakening.

In the present embodiment, the field weakening control is applied to the configuration for connecting and separating the motor 509 and the conveyance roller 306 by using the clutch 700. However, the present embodiment is not limited to a conveyance roller, and may be applied to a configuration for connecting and separating other loads.

In the present embodiment, the speed threshold ωth is set to ω0. However, this is not restrictive. For example, the speed threshold ωth may be set to a value smaller than ω0. The speed threshold ωth may be set to a value greater than ω0.

In the present embodiment, a stepping motor is used as the motor 509 for driving loads. However, other motors such as a direct-current (DC) motor may be used. The motor 509 is not limited to a two-phase motor. The present embodiment may be applied to other motors such as a three-phase motor.

Figure 10:
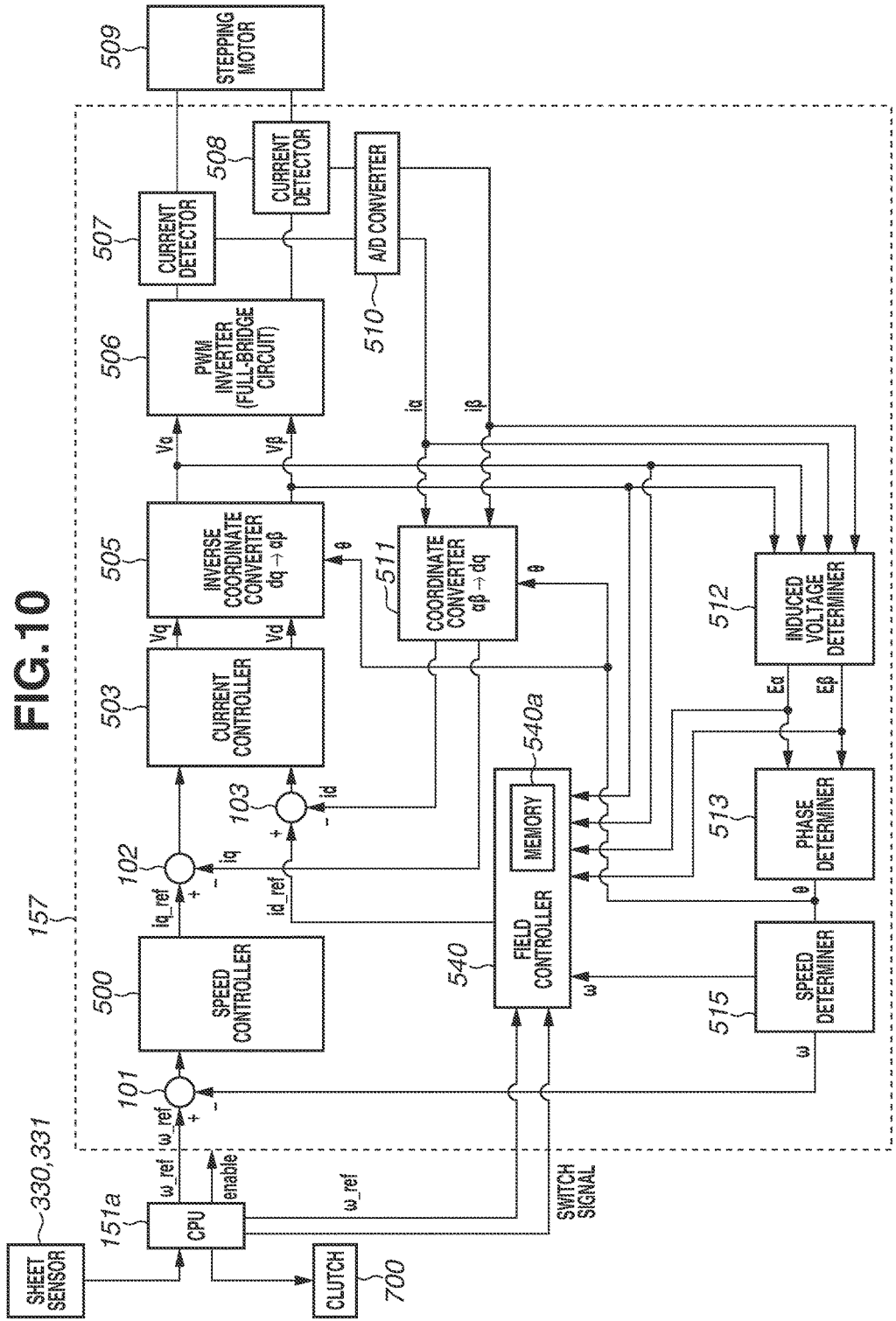
FIG. 10 is a block diagram illustrating a configuration of a motor control device that performs speed feedback control.

In the vector control according to the present embodiment, the motor 509 is controlled by performing phase feedback control. However, this is not restrictive. For example, the rotation speed ω of the rotor 402 may be fed back to control the motor 509. Specifically, as illustrated in FIG. 10, the motor control device 157 includes a speed determiner 515. The speed determiner 515 determines the rotation speed co based on a temporal change in the rotation phase θ output from the phase determiner 513. The rotation speed ω is determined by using equation (12). The CPU 151*a* outputs the command speed ω_ref indicating the target speed of the rotor 402. The motor control device 157 includes a speed controller 500, and the speed controller 500 is configured to generate and output a q-axis current command value iq_ref such that a deviation between the rotation speed ω and the command speed ω_ref decreases. By such a speed feedback control, the motor 509 may be controlled. Since the rotation speed ω is fed back in this configuration, the rotation speed ω of the rotor 402 can be controlled to a predetermined speed. The image forming apparatus 100 thus applies the vector control using the speed feedback control to a motor that drives a load the rotation speed of which needs to be controlled to a constant speed for the sake of appropriate image formation on a recording medium. Examples of such a load includes the photosensitive drum 309 and the conveyance belts 208 and 317. As a result, appropriate image formation can be performed on the recording medium.

In the present embodiment, a permanent magnet is used as the rotor 402. However, this is not restrictive.

According to an embodiment, motor control can be efficiently performed.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2017-022465, filed Feb. 9, 2017, which is hereby incorporated by reference herein in its entirety.

What is claimed is:

1. A sheet conveyance apparatus for conveying a sheet, the sheet conveyance apparatus comprising:
   a conveyance roller configured to convey the sheet;
   a motor configured to drive the conveyance roller;
   a connection member configured to connect or separate the conveyance roller and the motor;
   a phase determiner configured to determine a rotation phase of a rotor of the motor;
   a detector configured to detect a driving current flowing through a winding of the motor; and
   a controller configured to control the driving current in such a way that a value of a torque current component of the driving current detected by the detector becomes a target value of the torque current component, and control the driving current in such a way that a value of an exciting current component of the driving current detected by the detector becomes a target value of the exciting current component, wherein the torque current component is a current component that generates torque on the rotor and is expressed in a rotating coordinate system based on the rotation phase determined by the phase determiner, wherein the exciting current component is a current component that affects an intensity of a magnetic flux passing through the winding and is expressed in the rotating coordinate system,
   wherein the controller is configured to set the target value of the torque current component such that a deviation between a command phase indicating a target phase of the rotor and the rotation phase determined by the phase determiner decreases and, in a first period after first timing in a period in which the rotor rotates at a predetermined speed, set the target value of the exciting current component such that the magnetic flux passing through the winding becomes weaker than a magnetic flux of the rotor and, in a second period before the first timing, set the target value of the exciting current component such that the magnetic flux passing through the winding becomes stronger than that passing through the winding in the first period, wherein the first timing is a predetermined time before the conveyance roller and the motor are connected by the connection member.

2. The sheet conveyance apparatus according to claim 1, wherein, in a third period between the first timing and second timing in the first period, the controller is configured to set the target value of the exciting current component such that the magnetic flux passing through the winding becomes weaker than the magnetic flux of the rotor,
   wherein, in a fourth period after the second timing, the controller is configured to set the target value of the exciting current component such that the magnetic flux passing through the winding becomes stronger than that passing through the winding in the third period, and
   wherein the second timing is when a second predetermined time elapses after the conveyance roller and the motor connected by the connection member are separated by the connection member.

3. The sheet conveyance apparatus according to claim 1, wherein, in a period in which the rotor rotates at a speed lower than the predetermined speed, the controller is configured to set the target value of the exciting current component such that the magnetic flux passing through the winding becomes stronger than that passing through the winding in the first period.

4. The sheet conveyance apparatus according to claim 2, wherein, in the third period in the period in which the rotor rotates, the controller is configured to set the target value of the exciting current component to a negative value, and
wherein, in a period before the first timing and in a period after the second timing, the controller is configured to set the target value of the exciting current component to a value greater than the negative value.

5. The sheet conveyance apparatus according to claim 1, wherein, in a case where a rotation speed of the rotor is less than a threshold, a magnitude of torque capable of being generated on the rotor in a state where the value of the exciting current component is a negative value is less than or equal to that of the torque capable of being generated on the rotor in a state where the value of the exciting current component is zero,
wherein, in a case where the rotation speed of the rotor is the threshold or more, the magnitude of the torque capable of being generated on the motor in the state where the value of the exciting current component is the negative value is greater than that of the torque capable of being generated on the rotor in the state where the value of the exciting current component is zero, and
wherein the predetermined speed is higher than the threshold.

6. The sheet conveyance apparatus according to claim 4, wherein the controller is configured to switch the target value of the exciting current component from the value greater than the negative value to the negative value at the first timing.

7. The sheet conveyance apparatus according to claim 4, wherein the controller is configured to switch the target value of the exciting current component from the negative value to the value greater than the negative value at the second timing.

8. The sheet conveyance apparatus according to claim 4, wherein the controller is configured to switch the target value of the exciting current component from the value greater than the negative value to the negative value at timing when a third predetermined time elapses from a start of driving of the conveyance roller.

9. The sheet conveyance apparatus according to claim 4, wherein the controller is configured to switch the target value of the exciting current component from the negative value to the value greater than the negative value at timing when a fourth predetermined time elapses from a start of driving of the conveyance roller.

10. The sheet conveyance apparatus according to claim 1, further comprising:
a second control unit configured to control the connection member in such a way that the connection member connects or separates the conveyance roller and the motor; and
a sheet detector configured to detect presence or absence of the sheet, wherein the sheet detector is provided upstream of a nip portion of the conveyance roller in a conveyance direction in which the conveyance roller conveys the sheet,
wherein the first timing is a timing when the sheet detector detects a leading edge of the sheet, and
wherein the second control unit is configured to control the connection member in such a way that the connection member connects the conveyance roller and the motor at timing when the predetermined time elapses from the first timing.

11. The sheet conveyance apparatus according to claim 2, further comprising a second sheet detector configured to detect the presence or absence of the sheet,
wherein the second sheet detector is provided downstream of the nip portion in the conveyance direction,
wherein the second timing is a timing when the second predetermined time elapses after the sheet stops being detected by the second detection unit, and
wherein the second control unit is configured to control the connection member in such a way that the connection member separates the conveyance roller and the motor at the second timing.

12. The sheet conveyance apparatus according to claim 1, wherein, in a period before the first timing in the period in which the rotor rotates, the controller is configured to control the motor in a state in which the target value of the exciting current component is zero.

13. The sheet conveyance apparatus according to claim 2, wherein, in a period after the second timing in the period in which the rotor rotates, the controller is configured to control the motor in a state in which the target value of the exciting current component is zero.

14. The sheet conveyance apparatus according to claim 1, wherein the controller is configured to gradually change the target value of the exciting current component between a negative value and zero.

15. The sheet conveyance apparatus according to claim 1, wherein the controller is configured to set the target value of the exciting current component according to a rotation speed of the rotor.

16. The sheet conveyance apparatus according to claim 1, wherein the controller is configured to set the target value of the exciting current component according to a type of sheet to be conveyed.

17. A sheet conveyance apparatus for conveying a sheet, the sheet conveyance apparatus comprising:
a conveyance roller configured to convey the sheet;
a motor configured to drive the conveyance roller;
a connection member configured to connect or separate the conveyance roller and the motor;
a phase determiner configured to determine a rotation phase of a rotor of the motor;
a speed determiner configured to determine a rotation speed of the rotor;
a detector configured to detect a driving current flowing through a winding of the motor; and
a controller configured to control the driving current in such a way that a value of a torque current component of the driving current detected by the detector becomes a target value of the torque current component, and control the driving current in such a way that a value of an exciting current component of the driving current detected by the detector becomes a target value of the exciting current component, wherein the torque current component is a current component that generates torque on the rotor and is expressed in a rotating coordinate system based on the rotation phase determined by the phase determiner, wherein the exciting current component is a current component that affects an intensity of a magnetic flux passing through the winding and is expressed in the rotating coordinate system, wherein the controller is configured to set the target value of the torque current component such that a deviation between a command speed indicating a target speed of the rotor and the rotation speed determined by the speed determiner decreases and, in a first period after first timing in a period in which the rotor rotates at a predetermined speed, set the target value of the exciting current component such that the magnetic flux passing through the winding becomes weaker than a magnetic flux of the rotor and, in a second period before the first timing, set the target value of the exciting current component such that the magnetic flux passing through the winding becomes stronger than that passing through the winding in the first period, wherein the first timing is a predetermined time before the conveyance roller and the motor are connected by the connection member.

18. A document feeding apparatus for feeding a document, the document feeding apparatus comprising:
a document tray on which a document is stacked;
a conveyance roller configured to convey the document stacked on the document tray;
a motor configured to drive the conveyance roller;
a connection member configured to connect or separate the conveyance roller and the motor;
a phase determiner configured to determine a rotation phase of a rotor of the motor;
a detector configured to detect a driving current flowing through a winding of the motor; and
a controller configured to control the driving current in such a way that a value of a torque current component of the driving current detected by the detector becomes a target value of the torque current component, and control the driving current in such a way that a value of an exciting current component of the driving current detected by the detector becomes a target value of the exciting current component, wherein the torque current component is a current component that generates torque on the rotor and is expressed in a rotating coordinate system based on the rotation phase determined by the phase determiner, wherein the exciting current component is a current component that affects an intensity of a magnetic flux passing through the winding and is expressed in the rotating coordinate system, wherein the controller is configured to set the target value of the torque current component such that a deviation between a command phase indicating a target phase of the rotor and the rotation phase determined by the phase determiner decreases and, in a first period after first timing in a period in which the rotor rotates at a predetermined speed, set the target value of the exciting current component such that the magnetic flux passing through the winding becomes weaker than a magnetic flux of the rotor and, in a second period before the first timing, set the target value of the exciting current component such that the magnetic flux passing through the winding becomes stronger than that passing through the winding in the first period, wherein the first timing is a predetermined time before the conveyance roller and the motor are connected by the connection member.

19. A document reading apparatus for reading an image of a document, the document reading apparatus comprising:
a document tray on which a document is stacked;
a conveyance roller configured to convey the document stacked on the document tray;
a reading unit configured to read the document conveyed by the conveyance roller;
a motor configured to drive the conveyance roller;
a connection member configured to connect or separate the conveyance roller and the motor;
a phase determiner configured to determine a rotation phase of a rotor of the motor;
a detector configured to detect a driving current flowing through a winding of the motor; and
a controller configured to control the driving current in such a way that a value of a torque current component of the driving current detected by the detector becomes a target value of the torque current component, and control the driving current in such a way that a value of an exciting current component of the driving current detected by the detector becomes a target value of the exciting current component, wherein the torque current component is a current component that generates torque on the rotor and is expressed in a rotating coordinate system based on the rotation phase determined by the phase determiner, wherein the exciting current component is a current component that affects an intensity of a magnetic flux passing through the winding and is expressed in the rotating coordinate system, wherein the controller is configured to set the target value of the torque current component such that a deviation between a command phase indicating a target phase of the rotor and the rotation phase determined by the phase determiner decreases and, in a first period after first timing in a period in which the rotor rotates at a predetermined speed, set the target value of the exciting current component such that the magnetic flux passing through the winding becomes weaker than a magnetic flux of the rotor and, in a second period before the first timing, set the target value of the exciting current component such that the magnetic flux passing through the winding becomes stronger than that passing through the winding in the first period, wherein the first timing is a predetermined time before the conveyance roller and the motor are connected by the connection member.

20. An image forming apparatus for forming an image on a recording medium, the image forming apparatus comprising:
a conveyance roller configured to convey the recording medium;
an image forming unit configured to form an image on the recording medium conveyed by the conveyance roller;
a motor configured to drive the conveyance roller;
a connection member configured to connect or separate the conveyance roller and the motor;
a phase determiner configured to determine a rotation phase of a rotor of the motor;
a detector configured to detect a driving current flowing through a winding of the motor; and
a controller configured to control the driving current in such a way that a value of a torque current component of the driving current detected by the detector becomes a target value of the torque current component, and control the driving current in such a way that a value of an exciting current component of the driving current detected by the detector becomes a target value of the exciting current component, wherein the torque current component is a current component that generates torque on the rotor and is expressed in a rotating coordinate system based on the rotation phase determined by the phase determiner, wherein the exciting current component is a current component that affects an intensity of a magnetic flux passing through the winding and is expressed in the rotating coordinate system, wherein the controller is configured to set the target value of the torque current component such that a deviation between a command phase indicating a target phase of the rotor and the rotation phase determined by the phase determiner decreases and, in a first period after first timing in a period in which the rotor rotates at a predetermined speed, set the target value of the exciting current component such that the magnetic flux passing through the winding becomes weaker than a magnetic flux of the rotor and, in a second period before the first timing, set the target value of the exciting current component such that the magnetic flux passing through the winding becomes stronger than that passing through the winding in the first period, wherein the first timing is a predetermined time before the conveyance roller and the motor are connected by the connection member.

* * * * *